Oct. 23, 1923.

J. R. GAMMETER 1,471,787

TIRE PAINTING MACHINE

Filed Sept. 7, 1921

Inventor
John R. Gammeter
By Robert M Pierson
Atty.

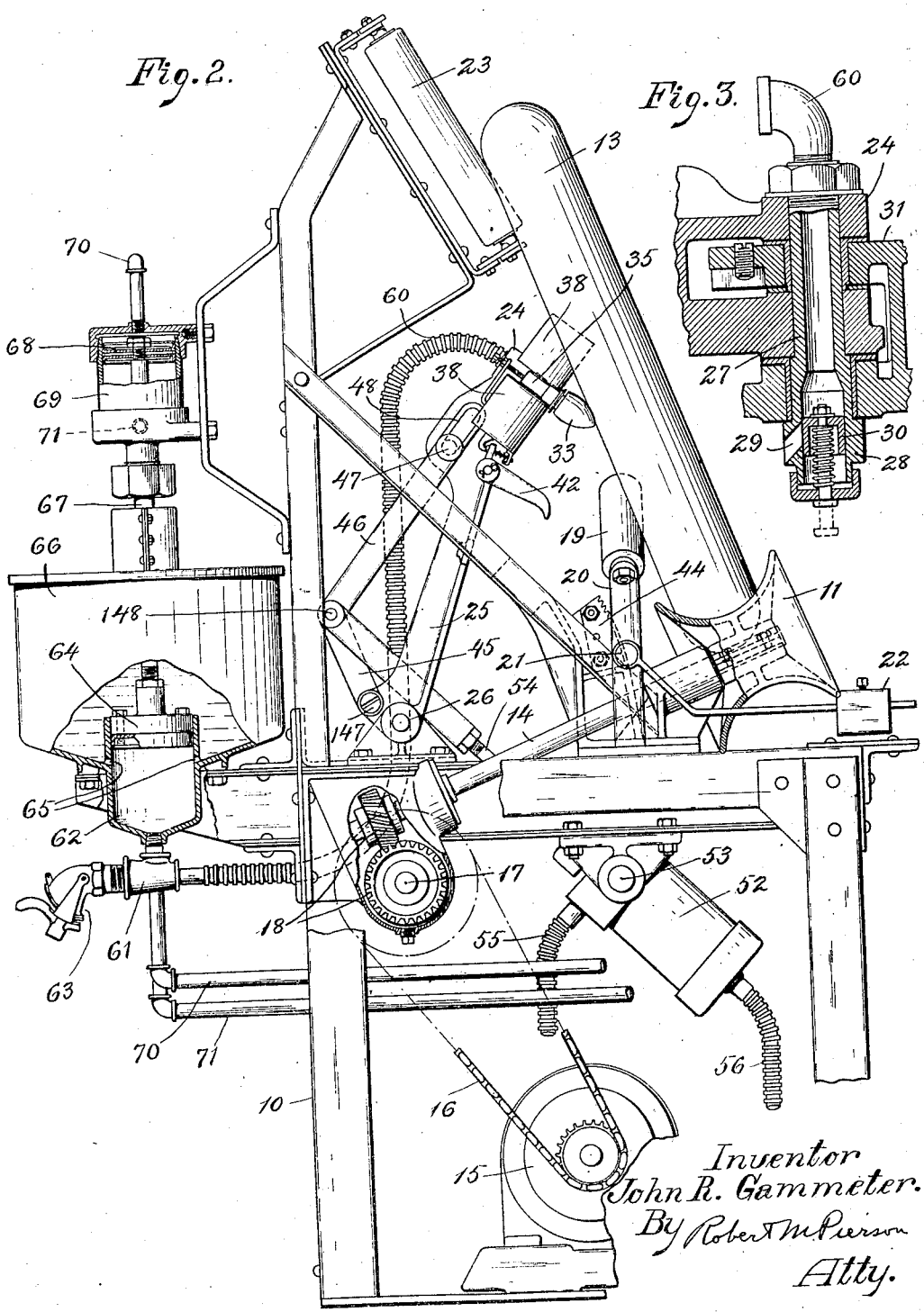

Oct. 23, 1923.
J. R. GAMMETER
1,471,787
TIRE PAINTING MACHINE
Filed Sept. 7, 1921
3 Sheets-Sheet 3
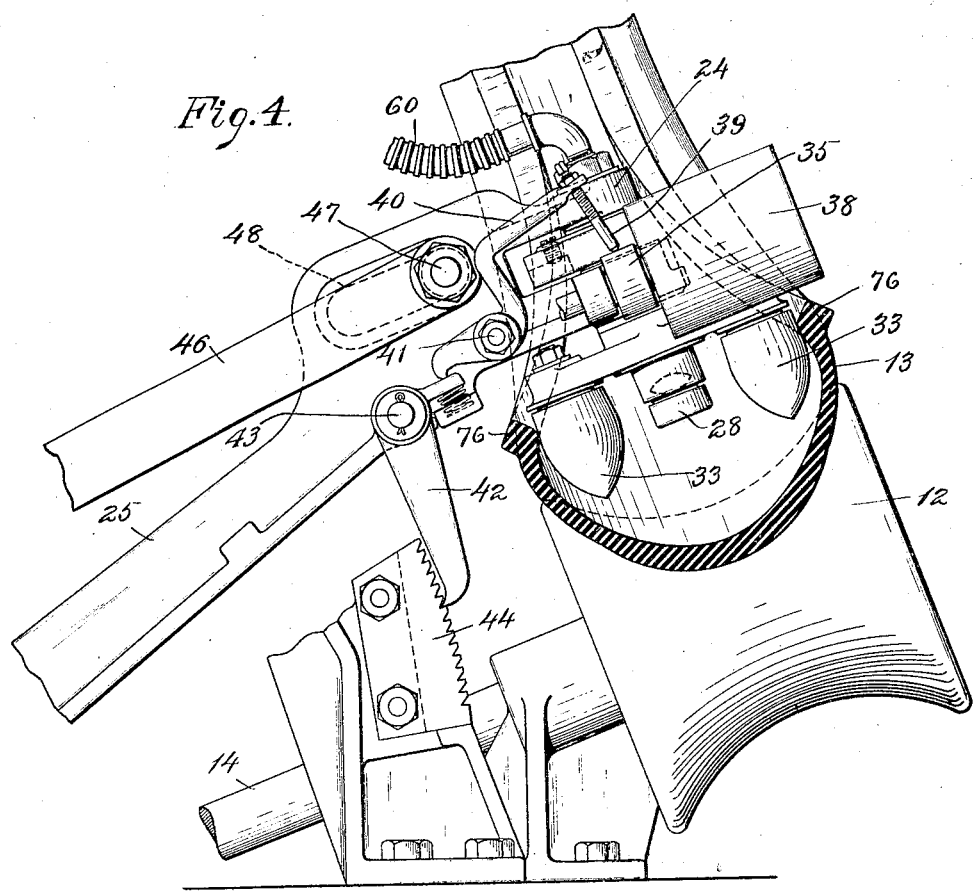
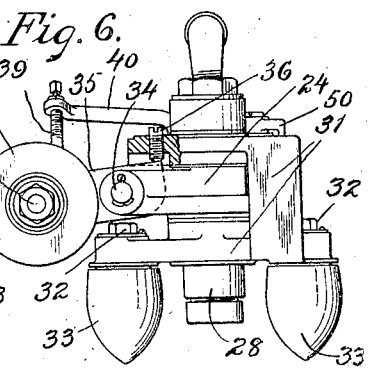
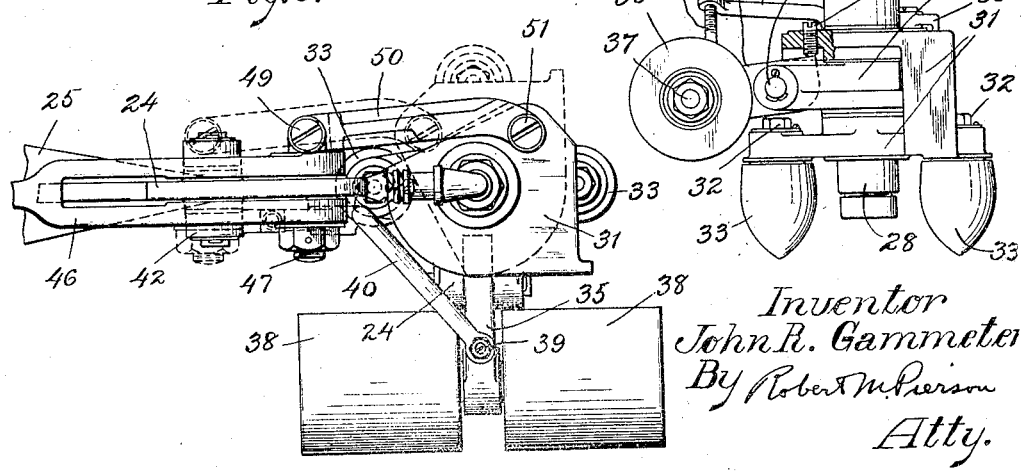
Inventor
John R. Gammeter
By Robert M. Pierson
Atty.

Patented Oct. 23, 1923.

1,471,787

UNITED STATES PATENT OFFICE.

JOHN R. GAMMETER, OF AKRON, OHIO, ASSIGNOR TO THE B. F. GOODRICH COMPANY, OF NEW YORK, N. Y., A CORPORATION OF NEW YORK.

TIRE-PAINTING MACHINE.

Application filed September 7, 1921. Serial No. 499,059.

*To all whom it may concern:*

Be it known that I, JOHN R. GAMMETER, a citizen of the United States, residing at Akron, in the county of Summit and State of Ohio, have invented a certain new and useful Tire-Painting Machine, of which the following is a specification.

This invention relates particularly to machines for applying a lubricant such as the ordinary liquid composition containing soapstone or the like to the interior surface of a pneumatic tire casing, in order to counteract the chafing of the inner tube. My principal object is to provide an improved means for supporting the tire casing in a position to be acted upon and for locally spreading apart its edges while the casing is being rotated in its own plane, in order to facilitate the distribution of the lubricating liquid, the means for injecting the lubricant being preferably incorporated as a part of the machine.

Of the accompanying drawings:

Fig. 2 is a side elevation, partly broken away and in section.

Fig. 3 is a detail section showing a portion of the spreader-head and the injecting nozzle.

Fig. 4 is a transverse section of the tire between the lower supporting rollers, showing the spreader-head and related parts, and omitting one of the feeler-rollers.

Fig. 5 is a plan view of the head and related parts.

Fig. 6 is a front view of said head, partly broken away.

Figure 1:
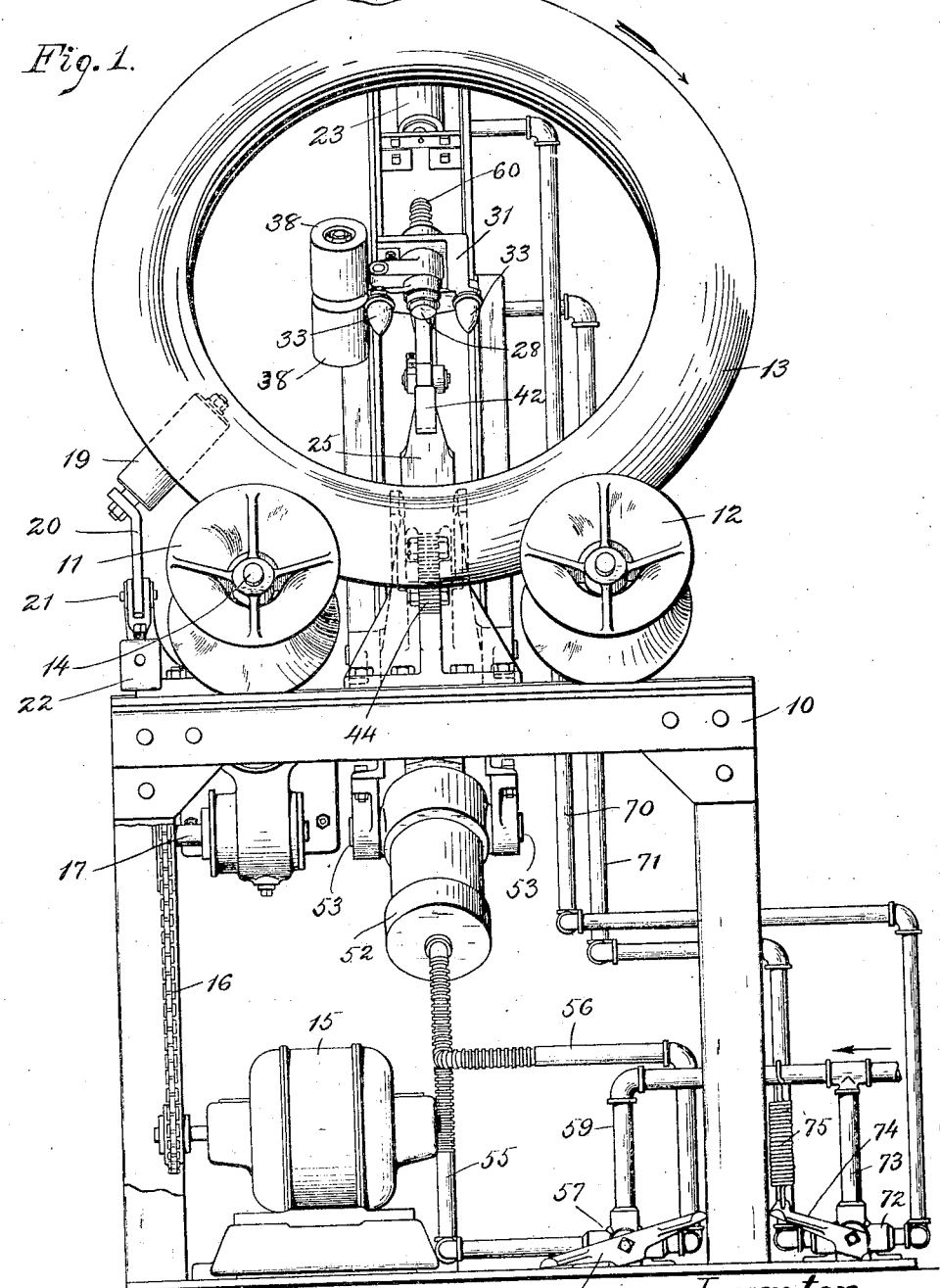
Fig. 1 is a front elevation of a tire-painting machine constructed according to my invention.

In the drawings, 10 is the frame of the machine and 11, 12 are a pair of large, grooved rollers for supporting a tire casing 13 at its lower sector, the roller 12 having a shaft which turns loosely in a suitable bearing, and the roller 11 having a shaft 14 which is driven by an electric motor 15, through a sprocket-chain 16, a counter-shaft 17, and suitable gearing 18. Near the roller 11 is loosely mounted a cylindrical guide-roller 19 on a radial spindle attached to an arm 20, which is pivoted to the machine frame at 21 and provided with a counterweight 22 for holding said roller yieldingly against the rear side of the tire and allowing the roller to adjust itself to tires of different cross-sectional size. The upper part of the tire is guided by a loosely-journaled, radial, cylindrical roller 23, mounted in a fixed position, and both of the rollers 19 and 23 are elongated so as to accommodate tires of different diameters. The described arrangement of rollers supports the tire, as shown, in an inclined, upright position, and permits the tires to be very quickly inserted in and removed from the machine, their weight holding them in the proper position to be operated on.

24 is a forked head formed at the outer end of a carrier-arm 25, which is pivoted to the machine frame at 26, said head carrying a pipe section 27 terminating at its lower end in a nozzle 28, having a discharge opening 29 controlled by a spring-closed, piston-checked-valve 30. Pivotally surrounding the pipe section 27 is a spreader base 31 at the ends of which, on opposite sides of the pivotal axis, are mounted a pair of studs 32, carrying a pair of loosely-journalled spreader-rollers 33 of conoidal or substantially acorn shape, with their pointed ends forwardly or downwardly directed. Also pivoted on a stud 34 on the head 31, and extending lengthwise of the trough of the tire is an arm or lever 35, whose heel is engaged by an adjustable stop-screw 36, and whose outer end carries a shaft 37 on which are loosely journaled a pair of feeler-rollers 38, adapted to have rolling contact with the edges of the tire. The outer arm of the lever 35 is engaged by an adjustable pin 39, on the long arm of a lever 40, fulcrumed to the carrier-arm 25 at 41, the short arm of said lever 40 engaging the short arm of a spring-retracted stop-pawl 42, pivoted to the carrier arm at 43 and coacting with the teeth of a fixed ratchet segment 44 on the machine frame.

On the arm 25 are mounted a pair of links 45, 46, forming a toggle for controlling the position of said arm and operating the spreader, the shorter link 45 being pivoted at 147 to the arm 25, and at 148 to the rear end of the longer link 46. The forward end of said longer link is forked to embrace a portion of the arm 25 and carries a pin 47 slidable in a slot 48 formed in said arm, said pin being pivoted at 49 to the rear end of a link 50, whose forward end is pivoted at 51 to the top of the spreader-base 31. 52 is an oscillatory pneumatic cylinder pivoted on trunnions 53 on the machine frame, and provided with a suitable piston, the upper end of whose rod 54 is connected with the pivot or knuckle-joint 148 of the toggle. The upper and lower ends respectively of the cylinder 52 are connected by pipes 55, 56 with the casing of a three-way valve device 57, the valve of which is operated by a double-ended foot-lever or treadle 58, the valve casing being supplied by a compressed air pipe 59 and provided with a suitable exhaust to the atmosphere (not shown).

The lubricant-injecting pipe-section 27 is connected by a pipe 60 with a fitting 61, having a branch connecting with a pump-cylinder 62 and another branch provided with a drain-valve 63. 64 is a vertically movable piston in the cylinder 62, which at the upper end of its stroke uncovers a pair of inlet ports 65 leading from a reservoir 66, and which closes said ports during its down stroke. The rod 67 of the pump-piston also constitutes the rod of a power-piston 68, mounted in an air-cylinder 69, the two ends of which are connected respectively by pipes 70, 71, with the casing of a three-way valve device 72, having a compressed-air supply-pipe 73 and a suitable exhaust, the valve of said device being actuated by a treadle or foot-lever 74, normally held by a spring 75 in a position to maintain the pistons 68 and 64 elevated.

In the operation of this machine, the normal position of the parts is as shown in Figs. 1 and 2, and the electric motor 15 may be kept constantly running to rotate the tire-driving roller 11 of the grooved pair 11, 12. A casing 13 being placed in position on the rollers, as shown, the operator then steps on the elevated end of the treadle 58, in order to discharge the lower end of the air-cylinder 52 and admit compressed air to its upper end, whereby the piston-rod 54 is drawn downwardly and the arm 25 depressed to bring its head 24 into operative relation with the lower sector of the tire casing, the weight of the arm and its head and the parts carried thereby serving to keep the rear end of the slot 48 against the pin 47 during such descent. During this movement of the parts, the longitudinal axis of the spreader connecting the conoidal rollers 33 is positioned lengthwise of the tire-trough, so that these spreader rollers can readily enter the tire casing between the bead edges 76 thereof. As the feeler-rollers 38 come in contact with the tire edges the descent of said rollers is arrested and a further slight descent of the spreader-head causes the nose of the stop-pawl 42 to be swung into engagement with the fixed ratchet 44 by the rocking of the levers 35 and 40, thus preventing any further descent of the arm and spreader. As the piston-rod 54 continues to retract, the toggle 45, 46 is straightened and the pin 47 is moved to the front end of the slot 48, thereby pushing the link 50 forward so as to oscillate the spreader-base 31 and turn the rollers 33 crosswise of the tire casing, as indicated in Figs. 4 and 5. The bead edges 76 of the casing are thereby forced apart as they travel past the spreading point, in order to open up and expose the interior of the casing. Concurrently or successively with the performance of this spreading action the operator depresses the treadle 74, in order to exhaust the lower end of the power-cylinder 69 and admit compressed air above the piston 68, whereby the pump-piston 64 is depressed and a charge of soapstone solution which has entered the cylinder 62 from the reservoir 66, below said pump-piston, is forced out through the pipe 60 and through the opening 29 of the nozzle 28, past the check-valve 30, into the tire casing, the air pressure being preferably so regulated that the partial or complete discharge of the pump-cylinder occupies substantially the time of one rotation of the tire-casing and the capacity of said cylinder being so chosen that one cylinder full is sufficient for the largest tire to be handled in the machine. The rotation of the tire casing causes the lubricant to be distributed circumferentially around its interior and said lubricant may be spread over the whole of the inner surface of the casing in any suitable manner, preferably by a paint brush in the hand of the operator, the tire being kept rotating in the machine long enough to accomplish the painting operation. The operator may reverse the pump-piston at the lower end or at any desired point in its down stroke, by restoring the treadle 58 to the position shown in Fig. 1, and when the painting operation is completed he releases the treadle 74 in order to exhaust the upper end and charge the lower end of the air-cylinder 52, whereby the toggle 45, 46 is first bent in order to turn the spreader lengthwise of the tire-trough, and thereafter the arm 25 is raised to the inoperative position shown in Figs. 1 and 2. The painted casing is then removed and a fresh one inserted, and the operation repeated.

It will be evident that various changes may be made in the above-described structure without departing from the scope of my invention.

I claim:

1. In a machine of the character described, the combination of means for supporting a pneumatic tire casing, a spreader having an entering position lengthwise of the tire trough and a spreading position crosswise thereof, and means for projecting said spreader into and retracting it from the tire casing and for turning it from entering to spreading position and vice versa, said means being adapted to effect such turning movements in determinate relation to the projecting and retracting movements.

2. In a machine of the character described, the combination of means for rotatably supporting a tire casing, and a spreader adapted to enter the tire trough, said spreader including a pair of rollers for engaging the inner sides of the tire edges, and a support for said rollers pivoted to turn the spreader either lengthwise or crosswise of the tire trough.

3. In a machine of the character described, the combination of means for rotatably supporting a tire casing in an upright, inclined position, and a spreader adapted to operate between the edges of the casing substantially at the lowest point thereof.

4. In a machine of the character described, the combination of a pair of rollers including a grooved driving roller for supporting an inclined upright tire casing at its lower sector, an inclined upper roller elongated to accommodate tires of different sizes, and means operating in the tire trough between said lower rollers for spreading apart the edges of the casing.

5. In a machine of the character described, the combination of means for rotatably supporting a tire casing, a spreader comprising a pair of conoidal rollers mounted with their small ends forward for entering between and spreading apart the edges of the casing, a pivoted support for said rollers, and means for turning said support either lengthwise or crosswise of the tire trough.

6. In a tire-painting machine, the combination of means for rotatably supporting a tire casing, a head movable into and out of an operative position adjacent to the edges of the casing thus supported, said head carrying an edge spreader and a lubricant injector, said spreader being adapted to enter the tire in a position lengthwise thereof and to be turned into a cross-wise position to spread the tire, and common means for moving said head into or out of said operative position and for turning said spreader, whereby such moving and turning are effected in automatically determined time relation.

7. In a tire-painting machine, the combination of means for rotatably supporting a tire casing, a head movable into and out of an operative position adjacent to the edges of the casing thus supported, a conduit section carried by said head and having a nozzle for injecting a lubricant into the casing, a spreader base pivotally surrounding said conduit section, and a pair of edge-spreading rollers carried by said base on opposite sides of its pivotal axis.

8. In a machine of the character described, the combination of means for supporting a tire casing, a spreader pivoted to turn lengthwise or crosswise of the trough of a casing thus supported, a spreader carrier movable to project the spreader into and retract it from its operative position in the casing, and operating means for said carrier adapted to turn the spreader into its crosswise posture by a continuation of the spreader-positioning movement of said operating means.

9. In a machine of the character described, the combination of means for supporting a tire casing, a spreader adapted to be turned either lengthwise or crosswise of a casing thus supported, a carrier arm pivotally supporting said spreader and pivoted to project the latter into and retract it from said casing, a toggle mounted on said arm and connected to oscillate said spreader, its operating end having a lost-motion connection with the arm, and operating means connected with said toggle for swinging the arm on its pivot and for bending the toggle.

10. In a machine of the character described, the combination of means for rotatably supporting a tire casing in an inclined upright position, a carrier arm pivoted to swing in a vertical plane, and a tire-edge spreader carried by said arm and movable thereby into an operative location in the lower sector of the casing.

11. In a tire-painting machine, the combination of means for rotatably supporting a tire casing in an inclined upright position, a carrier arm pivoted to swing in a vertical plane, and a lubricant injector carried by said arm and movable thereby into an operative location in the lower sector of the casing.

12. In a tire-painting machine, the combination of means for rotatably supporting and driving a tire casing in an inclined upright position, a head operating on the lower sector of the casing and carried by an arm which is pivoted to raise and lower the head in a vertical plane, a lubricant-injecting pipe carried by the head and terminating in a discharge nozzle, a spreader pivotally surrounding said pipe, a toggle mounted on the arm and having one end connected to turn said spreader crosswise of the casing after the arm has descended, and arm-operating means connected with the toggle.

13. In a machine of the character described, the combination of means for supporting a tire casing, a tire spreader, means for operating said spreader, and a stop member apart from the work for limiting its projection into the tire.

14. In a machine of the character described, the combination of means for supporting a tire casing, a spreader having an operative position between the edges of a casing thus supported, for spreading said edges apart, a stop member apart from the work, and feeler means operable by contact with said edges for limiting the projection of the spreader into the tire, by cooperation with said stop member.

15. In a machine of the character described, the combination of means for supporting a tire casing, a spreader movable into and out of the trough of a tire thus supported, a stop ratchet, a stop pawl co-acting therewith, and a feeler adapted to be actuated by the tire edge and controlling said pawl.

16. In a machine of the character described, the combination of means for rotatably supporting a tire casing, a head movable into and out of a position adjacent to the edges of a casing thus supported, a tire spreader carried by said head, a fixed stop ratchet, a pawl connected with said head, an arm pivoted on the head and carrying a feeler roller adapted to contact with an edge of the tire casing, and a connection between said arm and pawl for projecting the latter into engagement with the ratchet when the roller contacts with the tire edge.

In witness whereof I have hereunto set my hand this 6th day of September, 1921.

JOHN R. GAMMETER.